(12) United States Patent
Croak et al.

(10) Patent No.: US 8,737,575 B1
(45) Date of Patent: May 27, 2014

(54) METHOD AND APPARATUS FOR TRANSPARENTLY RECORDING MEDIA COMMUNICATIONS BETWEEN ENDPOINT DEVICES

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1431 days.

(21) Appl. No.: 11/236,928

(22) Filed: Sep. 27, 2005

(51) Int. Cl.
*H04M 1/64* (2006.01)
*H04M 3/42* (2006.01)

(52) U.S. Cl.
USPC ........................................ 379/85; 379/201.01

(58) Field of Classification Search
USPC ............... 713/168; 379/88.17, 201.01, 88.26; 704/235
See application file for complete search history.

(56) References Cited

U.S. PATENT DOCUMENTS

| | | | | |
|---|---|---|---|---|
| 5,907,600 A * | 5/1999 | Fuller et al. | ............... | 379/106.01 |
| 6,088,362 A * | 7/2000 | Turnbull et al. | ............... | 370/442 |
| 6,987,841 B1 * | 1/2006 | Byers et al. | ................. | 379/88.17 |
| 2002/0118798 A1 * | 8/2002 | Langhart et al. | ............. | 379/67.1 |
| 2003/0048884 A1 * | 3/2003 | Mateu | ......................... | 379/88.22 |
| 2006/0053010 A1 * | 3/2006 | Chapman et al. | ............. | 704/235 |
| 2006/0200666 A1 * | 9/2006 | Bailey, Jr. | ..................... | 713/168 |
| 2009/0046841 A1 * | 2/2009 | Hodge | ......................... | 379/189 |

\* cited by examiner

*Primary Examiner* — Rasha Al Aubaidi

(57) ABSTRACT

A method and apparatus for enabling the upgrade of a VoIP endpoint device by downloading a firmware component to support CALEA related monitoring and recording of conversations for all calls originated or terminated by the endpoint device are disclosed. The upgraded CALEA firmware component can be activated by the network on demand or when the signaling information to set up a watched call is received. Once the recording is completed it can be translated into a standard audio format file that can be uploaded transparently to the network and sent in near real time to the appropriate CALEA server.

16 Claims, 4 Drawing Sheets

200

300

METHOD AND APPARATUS FOR TRANSPARENTLY RECORDING MEDIA COMMUNICATIONS BETWEEN ENDPOINT DEVICES

The present invention relates generally to communication networks and, more particularly, to a method and apparatus for transparently recording conversations at endpoint devices in communication networks, e.g., packet networks such as Voice over Internet Protocol (VoIP) networks.

BACKGROUND OF THE INVENTION

The ability to support the needs of law enforcement agencies under the Communications Assistance for Law Enforcement Act (CALEA) in a packet network, e.g., a VoIP network can be challenging due to the mobility of VoIP endpoint devices that are used to access the VoIP network as well as the peer to peer nature of VoIP calls. An endpoint device can be relocated to another location easily as long as broadband connectivity is available but this poses the problem that the CALEA monitoring function that is performed in the network has to be re-configured or re-established every time the endpoint device moves to a new location.

Therefore, a need exists for a method and apparatus for transparently recording conversations at endpoint devices in a packet network, e.g., a VoIP network.

SUMMARY OF THE INVENTION

In one embodiment, the present invention enables the upgrade of a VoIP endpoint device by downloading a firmware component to support CALEA related monitoring and recording of conversations for all calls originated or terminated by the endpoint device. The upgraded CALEA firmware component can be activated by the network on demand or when the signaling information to set up a watched call is received. Once the recording is completed it can be translated into a standard audio format file that can be uploaded transparently to the network and sent in near real time to the appropriate CALEA server. A CALEA server provides the ability to identify and collect content of voice telephone calls traversing the VoIP Network, as mandated by the Communications Assistance for Law Enforcement Act.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
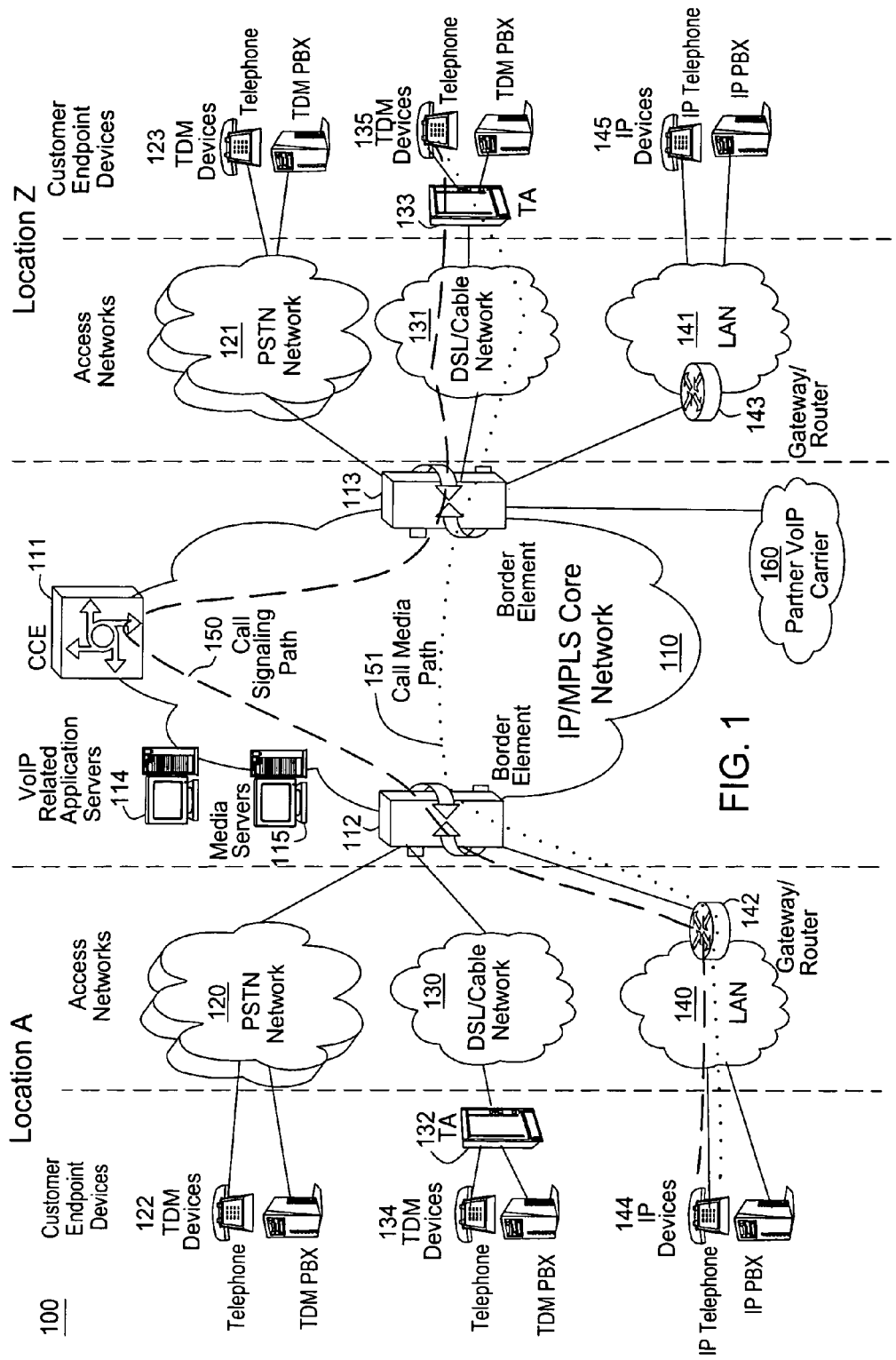
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The ability to support the needs of law enforcement agencies under the Communications Assistance for Law Enforcement Act (CALEA) in a packet network, e.g., a VoIP network can be challenging due to the mobility of VoIP endpoint devices that are used to access the VoIP network as well as the peer to peer nature of VoIP calls. An endpoint device can be relocated to another location easily as long as broadband connectivity is available but this poses the problem that the CALEA monitoring function that is performed in the network has to be re-configured or re-established every time the endpoint device moves to a new location.

To address this criticality, the present invention enables the upgrade of a VoIP endpoint device by downloading a firmware component to support CALEA related monitoring and recording of conversations for all calls originated or terminated by the endpoint device. The upgraded CALEA firmware component can be activated by the network on demand or when the signaling information to set up a watched call is received. Once the recording is completed it can be translated into a standard audio format file that can be uploaded transparently to the network and sent in near real time to the appropriate CALEA server. A CALEA server provides the ability to identify and collect content of voice telephone calls traversing the VoIP Network, as mandated by the Communications Assistance for Law Enforcement Act.

Figure 2:
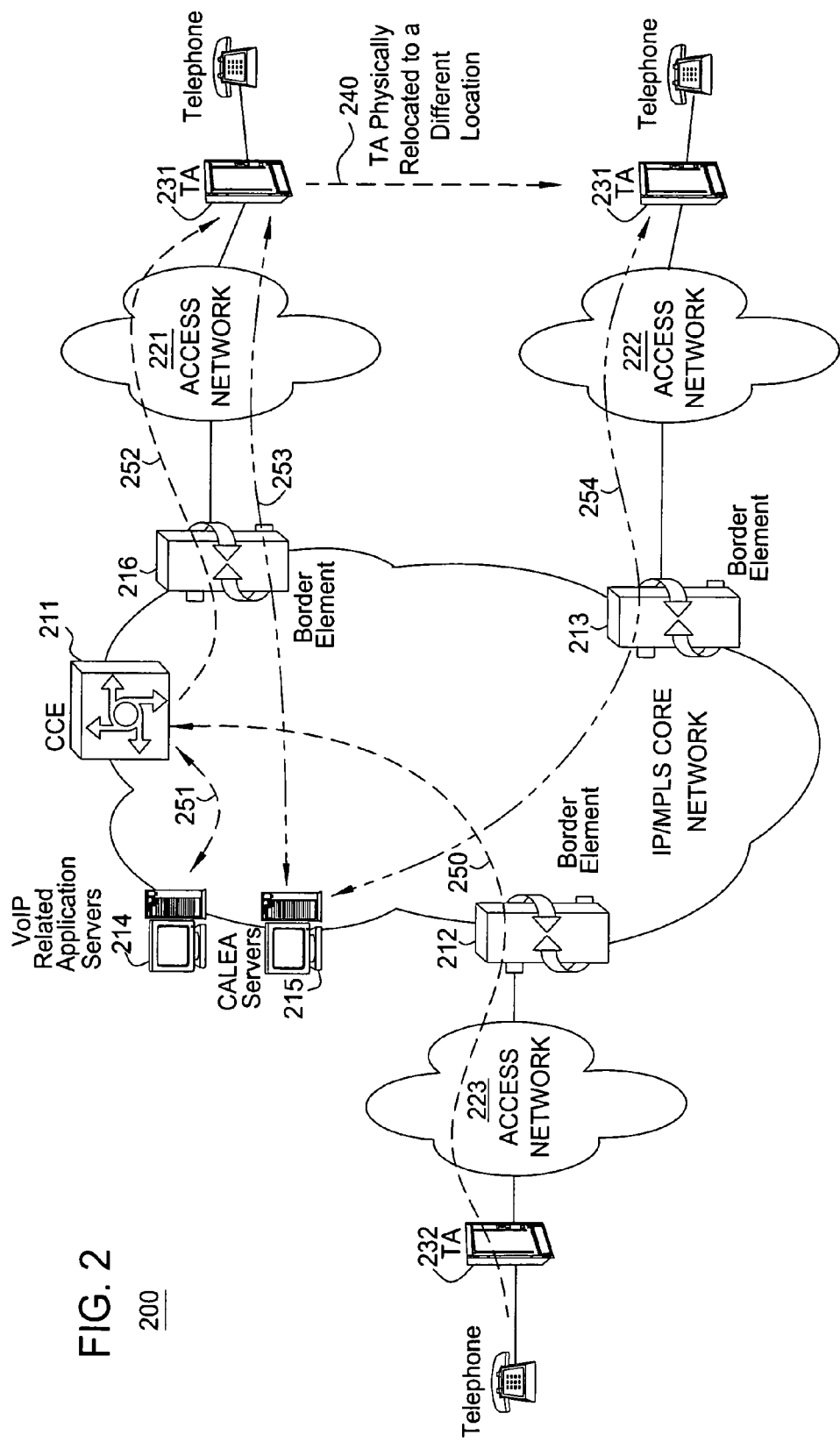
FIG. 2 illustrates an example of transparently recording conversations at endpoint devices in a packet network of the present invention.

FIG. 2 illustrates an exemplary communication architecture 200 for transparently recording conversations at endpoint devices in a packet network, e.g., a VoIP network of the present invention. In FIG. 2, the user of TA 231 is on the CALEA watch list. The network has downloaded a firmware component, via access network 221, to upgrade TA 231 to support CALEA monitoring functions using data flow 253 via BE 216. A calling party using TA 232 sends a call setup message, via access network 223, to TA 231 using signaling flow 250 via BE 250. Upon receiving the call setup message, CCE 211 communicates with AS 214 using signaling flow 251 to find out that the called party, associated with TA 231, is on the CALEA watch list. CCE 211 instructs BE 216 to activate the CALEA monitoring functions already embedded in TA 231 using signaling flow 252. In another embodiment, the activation of CALEA monitoring functions can be performed after the CALEA firmware upgrade has been performed on and before the first call is originated or terminated by TA 231.

Then CCE 211 completes the call setup procedures using signaling flow 252 to connect the call between TA 232 and TA 231. Once the call setup is completed and the conversation flow between TA 231 and 232 is ongoing, the upgraded CALEA firmware component will begin recording the conversation flow. The recorded conversation will be stored in a standard audio format file such as, but is not limited to, way or mp3 format. When the call is finished between TA 231 and TA 232, TA 231 will then upload the stored audio file to CALEA server 215 via access network 221 and BE 216 using data flow 253.

Subsequently, TA 231 is physically relocated, shown in flow 240, to another location and connected to the VoIP network via access network 222 and BE 213 instead. Since the CALEA firmware component has already been downloaded and activated in TA 231, it will continue to provide the CALEA monitoring functions until the network instructs it to disable such functions. Therefore, when TA 231 originates or terminates a call, TA 231 will record all conversations associated with the call. Once the call is completed, TA 231 will then upload the recorded and stored audio file to CALEA server 215 using data flow 254. If TA 231 is relocated physically again to yet another location, it will continue to serve the CALEA monitoring functions until instructed by the network to disable it.

Figure 3:
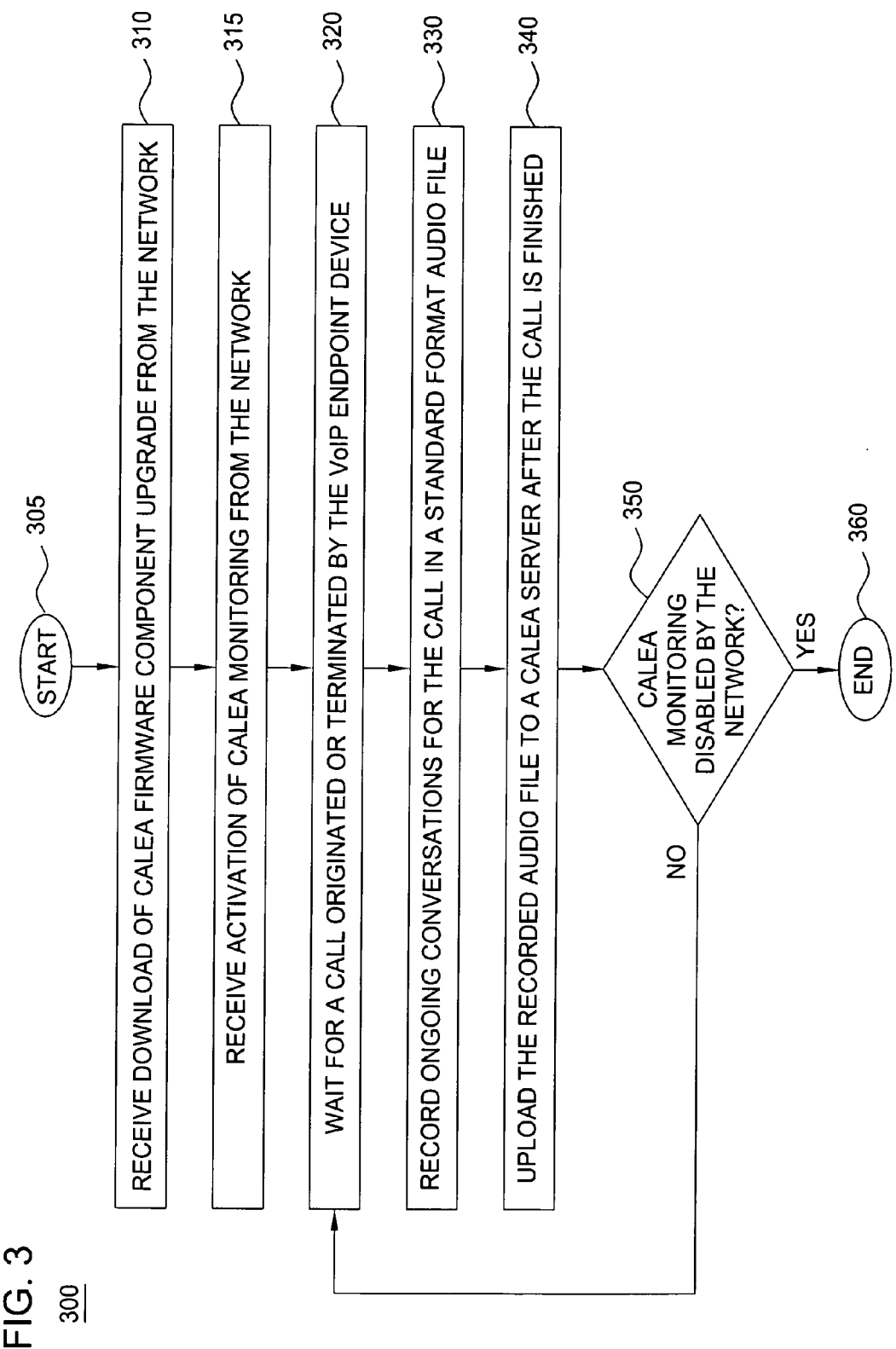
FIG. 3 illustrates a flowchart of a method for transparently recording conversations at endpoint devices in a packet network of the present invention.

FIG. 3 illustrates a flowchart of a method 300 for transparently recording conversations at endpoint devices in a packet network, e.g., a VoIP network of the present invention. Method 300 starts in step 305 and proceeds to step 310.

In step 310, the method receives a download of CALEA firmware component upgrade at a VoIP endpoint device from the network. For example, the TA receives the CALEA firmware.

In step 315, the method receives an instruction to activate the CALEA monitoring function at a VoIP endpoint device from the network. For example, the TA receives the instruction to activate the CALEA monitoring function.

In step 320, the method waits for a call that is either originated or terminated by the VoIP endpoint device. In one embodiment, steps 310 and 315 can be performed as part of the same step. In another embodiment, steps 310 and 315 can be performed as separate steps.

In step 330, the method records the conversations of a call originated or terminated by the VoIP endpoint device in a standard audio file format including, but not limited to, way or mp3 file format.

In step 340, the method uploads the recorded audio file to a CALEA server after the call is finished.

In step 350, the method checks if the network has issued an instruction to disable the CALEA monitoring function. If the network has issued an instruction to disable the CALEA monitoring function, the method proceeds to step 360; otherwise, the method proceeds back to step 320. The method ends in step 360.

Figure 4:
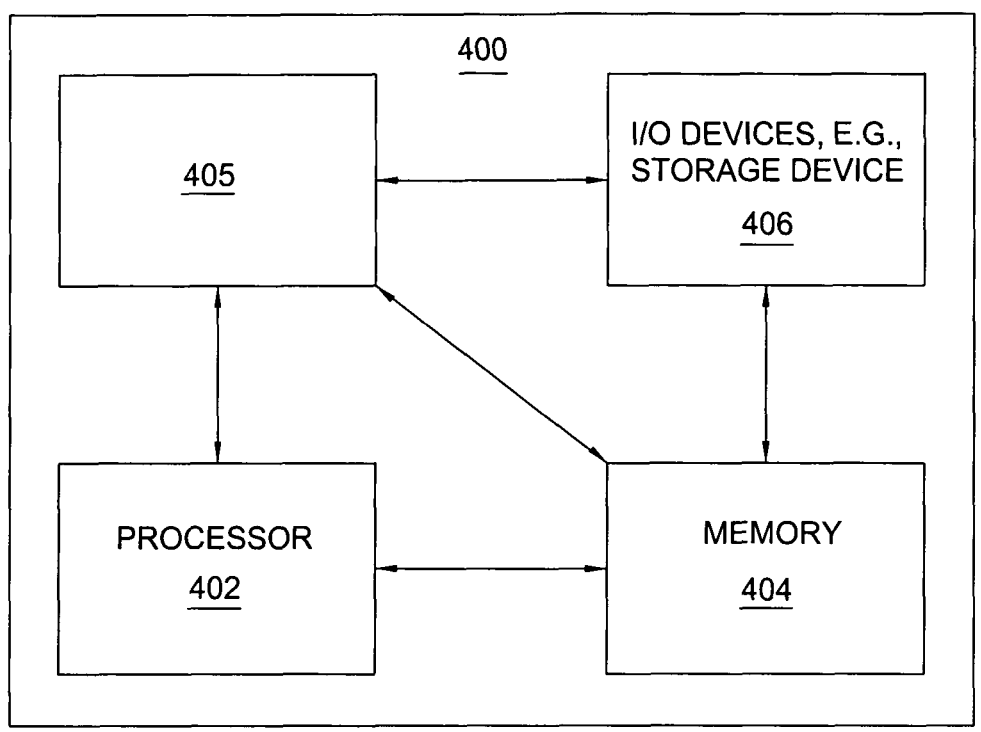
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for transparently recording conversations at endpoint devices, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for transparently recording conversations at endpoint devices can be loaded into memory 404 and executed by processor 402 to implement the functions as discussed above. As such, the present process 405 for transparently recording conversations at endpoint devices (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for recording a conversation at an endpoint device that is in communication with a communication network, comprising:

receiving a download of a firmware component at the endpoint device from the communication network to provide a monitoring function supporting communications assistance for law enforcement act monitoring;

receiving an instruction to activate the monitoring function at the endpoint device from the communication network, wherein the instruction is sent by a call control element, wherein the instruction is received from the call control element when the call control element determines from a call setup message for the call that a user of the endpoint device is on a watch list;

recording the conversation by the endpoint device on the endpoint device via the monitoring function for a call, wherein the endpoint device is used for the call and to record the conversation between a calling party and a called party, wherein the endpoint device is an endpoint device of one of the calling party and the called party; and uploading by the endpoint device a recorded call to a communications assistance for law enforcement act server after the call has finished.

2. The method of claim 1, wherein the communication network is an internet protocol network.

3. The method of claim 1, wherein the endpoint device is an internet protocol endpoint device.

4. The method of claim 1, wherein the conversation conducted during the call is recorded in a standard audio file format.

5. The method of claim 4, wherein the standard audio file format comprises a mp3 format.

6. The method of claim 1, further comprising:

disabling the monitoring function by the endpoint device when a disabling instruction is received from the communication network.

7. The method of claim 6, wherein the disabling instruction is sent by the call control element.

8. A non-transitory computer-readable medium storing a plurality of instructions which, when executed by a processor of an endpoint device, cause the processor to perform operations for recording a conversation at the endpoint device that is in communication with a communication network, the operations comprising:

receiving a download of a firmware component at the endpoint device from the communication network to provide a monitoring function supporting communications assistance for law enforcement act monitoring;

receiving an instruction to activate the monitoring function at the endpoint device from the communication network, wherein the instruction is sent by a call control element, wherein the instruction is received from the call control element when the call control element determines from a call setup message for the call that a user of the endpoint device is on a watch list;

recording the conversation by the endpoint device on the endpoint device via the monitoring function for a call, wherein the endpoint device is used for the call and to record the conversation between a calling party and a called party, wherein the endpoint device is an endpoint device of one of the calling party and the called party; and uploading by the endpoint device a recorded call to a communications assistance for law enforcement act server after the call has finished.

9. The non-transitory computer-readable medium of claim 8, wherein the communication network is an internet protocol network.

10. The non-transitory computer-readable medium of claim 8, wherein the endpoint device is an internet protocol endpoint device.

11. The non-transitory computer-readable medium of claim 8, wherein the conversation conducted during the call is recorded in a standard audio file format.

12. The non-transitory computer-readable medium of claim 11, wherein the standard audio file format comprises a mp3 format.

13. The non-transitory computer-readable medium of claim 8, further comprising:

disabling the monitoring function by the endpoint device when a disabling instruction is received from the communication network.

14. The non-transitory computer-readable medium of claim 13, wherein the disabling instruction is sent by the call control element.

15. An apparatus for recording a conversation at an endpoint device that is in communication with a communication network, comprising:

a processor of the endpoint device; and a computer-readable medium storing a plurality of instructions which, when executed by the processor, cause the processor to perform operations, the operations comprising:

receiving a download of a firmware component at the endpoint device from the communication network to provide a monitoring function supporting communications assistance for law enforcement act monitoring;

receiving an instruction to activate the monitoring function at the endpoint device from the communication network, wherein the instruction is sent by a call control element, wherein the instruction is received from the call control element when the call control element determines from a call setup message for the call that a user of the endpoint device is on a watch list;

recording the conversation by the endpoint device on the endpoint device via the monitoring function for a call, wherein the endpoint device is used for the call and to record the conversation between a calling party and a called party, wherein the endpoint device is an endpoint device of one of the calling party and the called party; and uploading a recorded call to a communications assistance for law enforcement act server after the call has finished.

16. The apparatus of claim 15, wherein the communication network is an internet protocol network.

* * * * *